United States Patent [19]
Sakai et al.

[11] Patent Number: 5,337,630
[45] Date of Patent: Aug. 16, 1994

[54] VEHICLE AUTOMATIC TRANSMISSION CONTROL SYSTEM

[75] Inventors: Ichiro Sakai; Shinichi Sakaguchi; Takashi Haga, all of Saitama, Japan

[73] Assignee: Honda Giken Kogyo Kabushiki Kaisha, Tokyo, Japan

[21] Appl. No.: 940,621

[22] Filed: Sep. 4, 1992

[30] Foreign Application Priority Data

Sep. 12, 1991 [JP] Japan .................. 3-260953

[51] Int. Cl.$^5$ .................. F16H 61/02
[52] U.S. Cl. .................. 477/131; 364/424.1
[58] Field of Search .......... 74/866; 364/424.1, 424.02, 364/426.01

[56] References Cited

U.S. PATENT DOCUMENTS

| | | | |
|---|---|---|---|
| 4,531,432 | 7/1985 | Inagaki et al. | 74/866 |
| 4,807,495 | 2/1989 | Wallace | 74/844 |
| 5,024,125 | 6/1991 | Baba | 74/866 |
| 5,036,730 | 8/1991 | Sakai et al. | 74/866 |
| 5,067,374 | 11/1991 | Sakai et al. | 74/866 |
| 5,079,704 | 1/1992 | Sakai et al. | 364/424.1 |
| 5,079,705 | 1/1992 | Sakai et al. | 364/424.1 |
| 5,095,435 | 3/1992 | Tokoro et al. | 74/866 X |
| 5,099,428 | 3/1992 | Takahashi | 74/866 X |
| 5,101,350 | 3/1992 | Tokoro | 74/866 X |
| 5,124,916 | 6/1992 | Tokoro et al. | 74/866 X |
| 5,148,721 | 9/1992 | Anan et al. | 74/866 |
| 5,163,530 | 11/1992 | Nakamura et al. | 364/426.01 X |

FOREIGN PATENT DOCUMENTS 1293240 of 1989 Japan .
1-98743 4/1989 Japan .

OTHER PUBLICATIONS

European Search Report Communication.

*Primary Examiner*—Dirk Wright
*Attorney, Agent, or Firm*—Lyon & Lyon

[57] ABSTRACT

In a system for controlling a gear ratio of a multi-step geared or continuously variable automatic transmission of a vehicle, the gear ratio is determined through fuzzy production rules each having one of an ATF temperature, a steering or an engine coolant temperature. For example, the rule regarding the ATF temperature defines such that the gear position should be shifted down if the ATF temperature is high. With the arrangement, when the ATF temperature is high, the gear position is determined in the downshifting direction so that the amount of torque converter slippage can be reduced, whereby avoiding temperature rise in the transmission. And since the engine speed is relatively high at that situation, motive force could be sufficient even climbing a hill.

6 Claims, 8 Drawing Sheets

FIG.5

| Rule number | Rule type | Subject | Antecedent | | Conclusion | Rule meaning |
|---|---|---|---|---|---|---|
| 1 | Basic rule | Ordinary driving | V (km/h) | Current gear | Gear (ratio) | If vehicle speed is high and current gear is low (gear ratio is large), then shift up greatly (lower gear ratio greatly). |
| 2 | ″ | ″ | V | Current gear | | If vehicle speed is low and current gear is high (gear ratio is small), then shift down greatly (raise gear ratio greatly). |
| 3 | ″ | ″ | θ_TH (deg) | V | | If degree of throttle opening is small and vehicle speed is high, then shift up greatly (lower gear ratio greatly). |
| 4 | ″ | ″ | θ_TH | V | | If degree of throttle opening is small and vehicle speed is low, then shift up slightly (lower gear ratio slightly). |
| 5 | ″ | ″ | θ_TH | V | | If degree of throttle opening is large and vehicle speed is high, then shift down slightly (raise gear ratio slightly). |
| 6 | ″ | ″ | θ_TH | V | | If degree of throttle opening is large and vehicle speed is low, then shift down greatly (raise gear ratio greatly). |

FIG.6

| Rule number | Rule type | Subject | Antecedent | | | | Conclusion | Rule meaning |
|---|---|---|---|---|---|---|---|---|
| 7 | Extra rule | Hill-climbing | 100 192(kg) Driving resistance | 0 84(deg) θ_TH | 20 40 250 V(km/h) | 1 2 3 4 Current gear | -3-2-1 1 2 3 Gear (ratio) | During hill-climbing if degree of throttle opening is small, then shift down greatly (raise gear ratio greatly). |
| 8 | " | " | ← | 0 84 θ_TH | ← | 1 2 3 4 " | -3 " | During hill-climbing if current gear is high (gear ratio is small) and degree of throttle opening is large, then shift down greatly (raise gear ratio greatly). |
| 9 | " | Hill-descent | -128 0 Driving resistance | 0 10.5 84 θ_TH | ← | 1 2 3 4 " | -3 " | During hill-descending, shift down greatly (raise gear ratio greatly) to provide engine braking |
| 10 | " | ATF temp. | 130 140 ATF(°C) | | | | -3 " | If ATF temperature is high, then shift down slightly (raise gear ratio slightly). |

FIG. 7

| Rule number | Rule type | Subject | Antecedent | Conclusion | Rule meaning |
|---|---|---|---|---|---|
| 10 | Extra rule | Winding road driving | Steering angle (degrees) (left)(right) | Gear (ratio) | If steering angle is large, hold current gear (ratio). |

FIG. 8

| Rule number | Rule type | Subject | Antecedent | Conclusion | Rule meaning |
|---|---|---|---|---|---|
| 10 | Extra rule | Coolant temp. | (graph: 80, 110 Coolant temp. (°C)) | (graph: Gear (ratio)) | If coolant temperature is high, shift up slightly (lower gear ratio slightly). |

VEHICLE AUTOMATIC TRANSMISSION CONTROL SYSTEM

BACKGROUND OF THE INVENTION

1. Field of the Invention

This invention relates to an improved vehicle automatic transmission control system.

2. Description of the Prior Art

The gear ratio (position) of a vehicle automatic transmission is generally selected by retrieval from a predetermined shift diagram stored in a microcomputer memory as a map, hereinafter referred to as "shift diagram map", using the throttle opening and the vehicle speed as address data. (See, for example, Japanese Laid-open Patent Publication No. 1(1989)-98743.)

Under some circumstances, the temperature of the ATF (automatic transmission fluid) of the transmission may become intolerably high. Since allowing the torque converter to continue to slip in such a condition leads to further increase in the ATF temperature, the prior art practice has been to cope with the situation by forcing the torque converter into lock-up mode so as to prevent slipping of the torque converter. However, since the torque converter cannot provide a torque increase during lock-up, the drivability of the vehicle is apt to be degraded owing to insufficient motive power during hill-climbing and the like.

Another drivability problem is experienced with automatic transmissions when driving on a road winding through hilly country. On entering a curve, the driver ordinarily releases the accelerator pedal and depresses the brake pedal. On coming out of the curve, he or she depresses the accelerator pedal again. When a vehicle with a prior art automatic transmission is driven in this way, the transmission shifts up when the accelerator pedal is released at the beginning of the curve and shifts down again when the road straightens out. The frequent shifting this leads to on a winding road annoys most drivers.

In addition, the engine speed has to be reduced for protecting the engine when the coolant temperature rises too high.

The assignee earlier proposed fuzzy logic-based automatic transmission control systems for overcoming the drawbacks of the conventional gearshift control based on a shift scheduling map in Japanese Laid-open Patent Publications No. 2(1990)-3739 and No. 2(1990)-85563 (also filed in the United States to mature as U.S. Pat. No. 5,036,730 and filed in EPO under 89306192.9); No. 2(1990)-3738 (also filed in the United States to mature as U.S. Pat. No. 5,079,705 and filed in EPO under 89306167.1); No. 2(1990)-138,558 and No. 2(1990)-138,561 (also filed in the United States to mature as U.S. Pat. No. 5,067,374 and filed in EPO under 89311976.8); No. 2(1990)-138,559, No. 2(1990)-138,560 and No. 2(1990)-150,558 (also filed in the United States to mature as U.S. Pat. No. 5,079,704 and filed in EPO under 89311970.1); and No. 4(1992)-8,964 (also filed the United States under U.S. Ser. No. 691,066 and EPO under 91303878.2).

SUMMARY OF THE INVENTION

The present invention is an improvement on the earlier developed system and is aimed at an automatic transmission control system which eliminates the aforesaid disadvantages of the prior art.

More specifically, an object of the invention is to provide a vehicle automatic transmission control system able to maintain good drivability while at the same time suppressing any tendency for the ATF to overheat.

Another object of the invention is to provide a vehicle automatic transmission control system able to prevent unnecessarily frequent gear shifting and thus maintain good drivability even when negotiating successive curves as during driving on a winding mountainous road.

Further object of the invention is to provide a vehicle automatic transmission control system which can quickly protect the engine when the engine coolant over-heats.

For realizing these objects, the present invention provides a system for controlling a multi-step geared or continuously variable automatic transmission of a vehicle, including first means for determining parameters at least indicative of an engine load and a vehicle speed, second means for carrying out a fuzzy reasoning at least using the determined parameters to determine a gear ratio to be shifted to and actuator means for driving a gear ratio shift mechanism in response to the determined gear ratio. In the system, the improvement comprises said first means further determines at least one among parameters each indicating a temperature of the transmission, a steering angle of the vehicle and an engine coolant temperature.

BRIEF DESCRIPTION OF THE DRAWINGS

These and other objects and advantages of the invention will be more apparent from the following description and drawings, in which:

FIG. 5 is a chart showing fuzzy production rules used in a fuzzy reasoning referred to in FIG. 3 flow chart;

FIG. 6 is a chart showing similar rules used in the fuzzy reasoning;

FIG. 7 is a chart showing another rule used in the fuzzy reasoning according to a second embodiment of the present invention; and FIG. 8 is a chart showing further rule used in the fuzzy reasoning according to a third embodiment of the present invention.

DETAILED DESCRIPTION OF THE PREFERRED EMBODIMENTS

Figure 1:
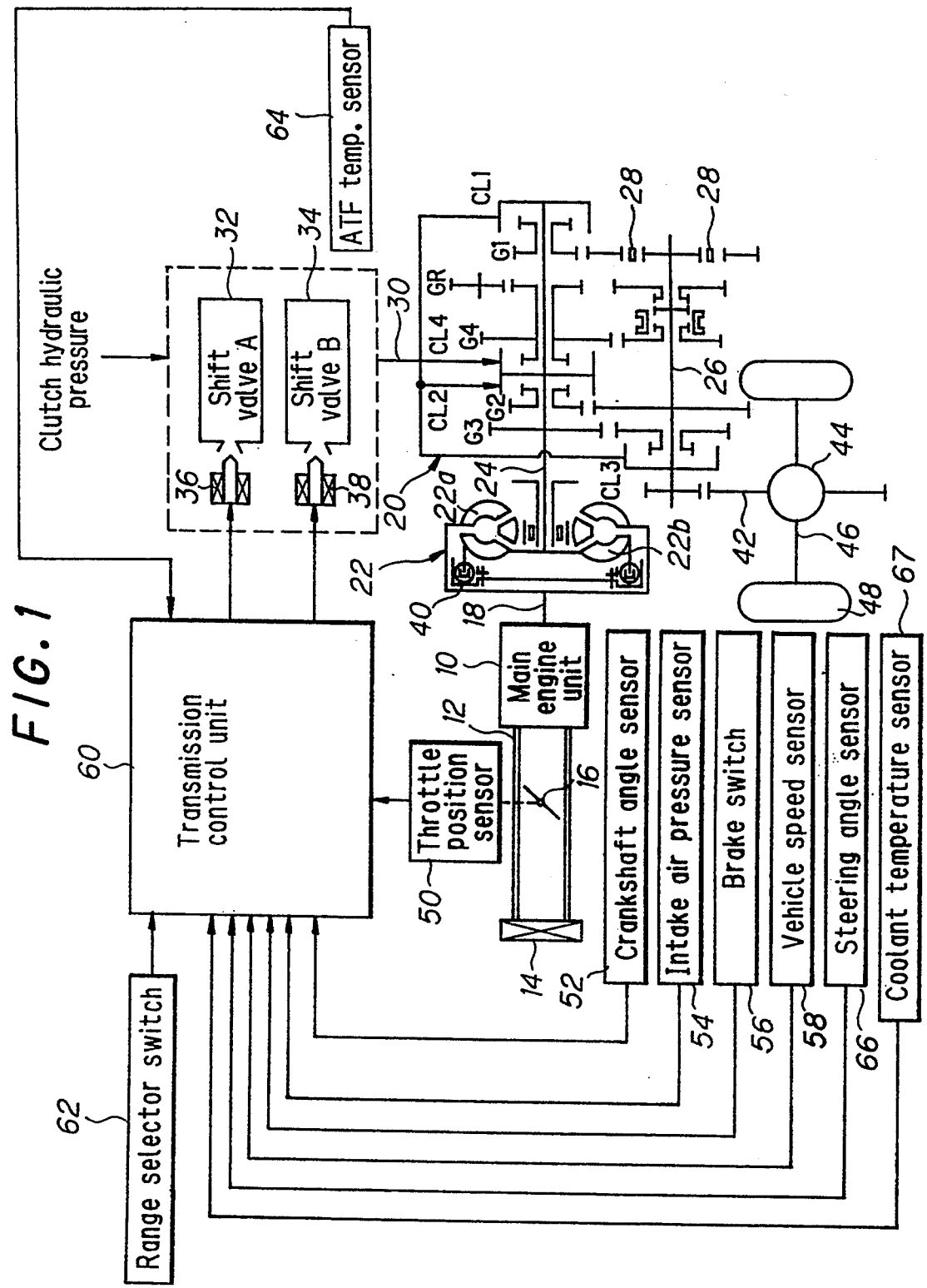
FIG. 1 is a schematic diagram showing the overhall arrangement of a vehicle automatic transmission control system according to the present invention.

FIG. 1 is a schematic diagram showing the over-all arrangement of the automatic transmission control system according to the present invention, in which the reference numeral 10 denotes the main unit of an internal combustion engine. The main engine unit 10 is connected with an air intake passage 12 having an air cleaner 14 attached to its far end. The flow rate of intake air supplied to the main engine unit 10 via the air cleaner 14 and the air intake passage 12 is controlled by a throttle valve 16 linked with and operated by means of an accelerator pedal (not shown) located on the vehicle floor in the vicinity of the driver's seat. A fuel injection valve (not shown) for supplying fuel to the engine is provided at an appropriate portion of the air intake passage 12 in the vicinity of the combustion chamber (not shown). The intake air mixed with the fuel enters the combustion chamber and, after being compressed by a piston (not shown), is ignited by a spark plug (not shogun). The fuel-air mixture burns explosively and drives the piston. The motive force of the piston is converted into rotating motion which is made available at an output shaft 18.

The stage following the main engine unit 10 is a transmission 20. The output shaft 18 is connected with a torque converter 22 of the transmission 20 and is linked with a pump impeller 22a thereof. A turbine runner 22b of the torque converter 22 is connected with a main shaft 24 (the transmission input shaft). A countershaft 26 (the transmission output shaft) is provided in parallel with the main shaft 24 and between the two shafts there are provided a first speed gear G1, a second speed gear G2, a third speed gear G3, a fourth speed gear G4 and a reverse gear GR, and these gears are provided respectively with multi-plate hydraulic clutches CL1, CL2, CL3 and CL4 (the clutch for the reverse gear is omitted from the drawing in the interest of simplicity). The first speed gear G1 is further provided with hydraulic one-way clutches 28. These hydraulic clutches are connected with a source of hydraulic pressure (not shown) by a hydraulic line 30, and a shift valve A 32 and a shift valve B 34 are provided in the hydraulic line 30. The positions of the two shift valves are changed by the energization/deenergization of respective solenoids 36 and 38, whereby the supply/removal of hydraulic pressure to/from the aforesaid clutches is controlled. Reference numeral 40 designates a lock-up mechanism of the torque converter 22. The countershaft 26 is connected with a differential 44 through a propeller shaft 42, and the differential 44 is connected with wheels 48 through a drive shafts 46. The speed-adjusted engine output is transmitted to the wheels through this power train.

In the vicinity of the throttle valve 16 of the air intake passage 12 there is provided a throttle position sensor 50 such as a potentiometer or the like for detecting the degree of opening of the throttle valve 16. In the vicinity of a rotating member (e.g. a distributor; not shown) of the main engine unit 10 there is provided a crankshaft angle sensor 52 such as an electromagnetic pickup or the like. The crankshaft angle sensor 52 detects the position of the piston in terms of the crankshaft angle and produces a signal once every prescribed number of degrees of crankshaft rotation. At an appropriate location downstream of the throttle valve 16 of the air intake passage 12 there is provided an intake air pressure sensor 54 for detecting the absolute pressure of the intake air. In the vicinity of the brake pedal (not shown) provided on the vehicle floor in the vicinity of the driver's seat there is provided a brake switch 56 for detecting depression of the brake pedal. At an appropriate location near one of the drive shafts 46 there is further provided a vehicle speed sensor 58 such as a reed switch or the like, which produces a signal once every prescribed number of degrees of drive shaft rotation. The outputs of the sensors are sent to a transmission control unit 60. The transmission control unit 60 also receives the output from a range selector switch 62 for detecting the selected position of a range selector.

In addition, a temperature sensor 64 for detecting the ATF (automatic transmission fluid) temperature is provided at an appropriate location of the transmission 20. And another sensor 66 is provided at an appropriate location of a steering mechanism (not shown) to detect a steering angle, i.e. the turning angle of the front wheels caused by the rotary motion of the steering wheel (not shown) generated by the driver. Moreover, a coolant temperature sensor 67 is provided at a coolant water passage (not shown) of the main engine unit 10 to detect the temperature of the coolant water. Outputs of the sensors are also sent to the control unit 60.

Figure 2:
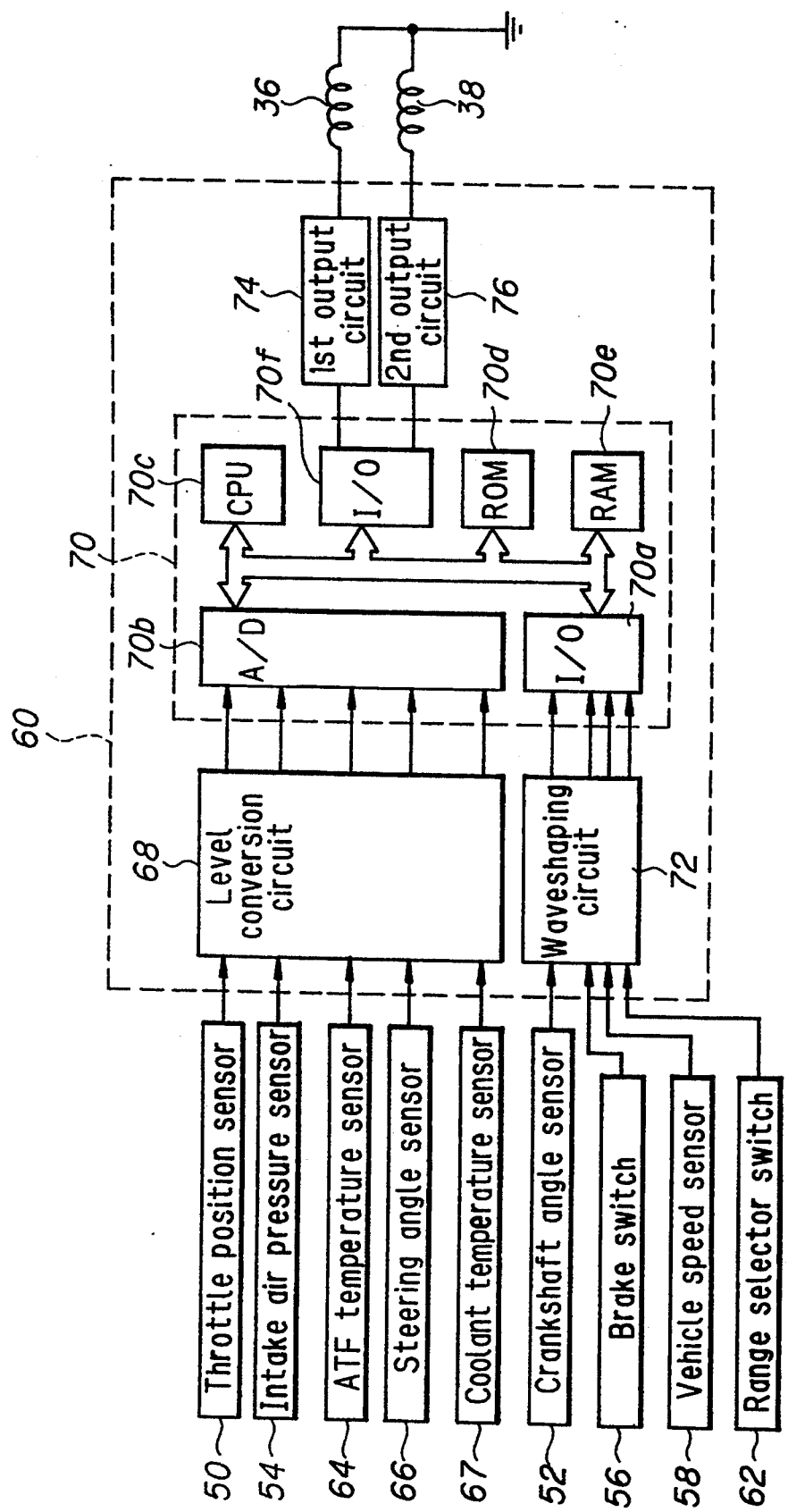
FIG. 2 is a block diagram showing the details of the control unit shown in FIG. 1.

FIG. 2 is a block diagram showing the transmission control unit 60 in detail. As shown in this figure, the analog outputs from the throttle position sensor 50 and the like are input to a level conversion circuit 68 in the transmission control unit 60 for amplification and the amplified signals are forwarded to a microcomputer 70. The microcomputer 70 has an input port 70a, an A/D (analog/digital) converter 70b, a CPU (central processing unit) 70c, a ROM (read/only memory) 70d, a RAM (random access memory) 70e, an output port 70f and groups of registers (not shown) and counters (not shown). The output from the level conversion circuit 68 is input to the A/D converter 70b whereby it is converted into digital values, and the digital values are stored in the RAM 70e. The outputs from the crankshaft angle sensor 52 and the like are first wave-shaped in a waveshaping circuit 72 and then input to the microcomputer through the input port 70a to be stored in the RAM 70e. On the basis of the input values and calculated values derived therefrom, the CPU 70c determines a gear position (gear ratio) in a manner to be explained later. In response to the result of the determination, a control value is sent through the output port 70f to a first output circuit 74 and a second output circuit 76 which energize/deenergize the solenoids 36 and 38 so as to shift gears or hold the current gear position as determined.

The operation of the control system will now be explained with respect to the flow charts of FIG. 3 and later figures.

Figure 4:
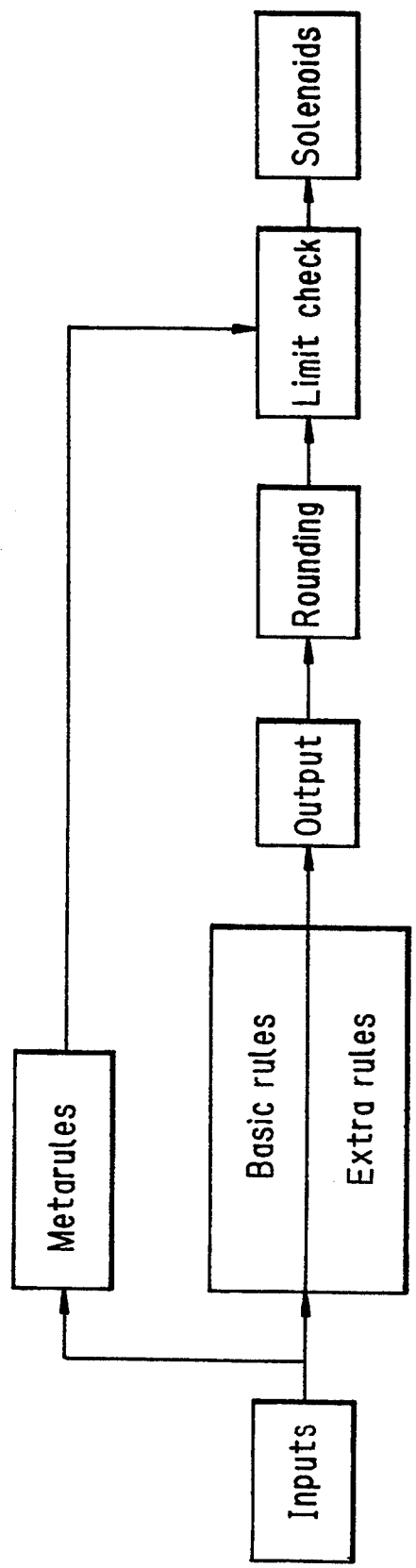
FIG. 4 is an explanatory block diagram showing the characteristic feature of the control system of the present invention.

Before going into a detailed description, however, the general features of the embodiments of the control system will first be explained with reference to FIG. 4. The system determines the gear ratio (position) on the basis of inputs and calculated values using fuzzy production rules (basic rules and extra rules which will be explained later). As the determined gear ratio may include a fractional part, it is rounded to an integral value for specifying the gear ratio (position), which is to be shifted to (or maintained), whereafter the so-obtained gear position is subjected to a final check using meta-rules (explained later) and then is output such that the solenoids are energized so as to realized the determined gear ratio (position).

The fuzzy production rules used in the reasoning are shown in FIGS. 5 and 6. The rules of FIG. 5 relate to ordinary or general driving circumstances (the basic rules) and the rules of FIG. 6 to special, limited driving circumstances such as hill-climbing, ATF temperature and the like (the extra rules). Rule 10 among the extra rules relates to the ATF temperature. In the fuzzy reasoning, the operating parameters used in these sets of rules are obtained and the value to be output is determined by reasoning using membership functions corresponding to the operating parameters defined by the individual rules.

Figure 3:
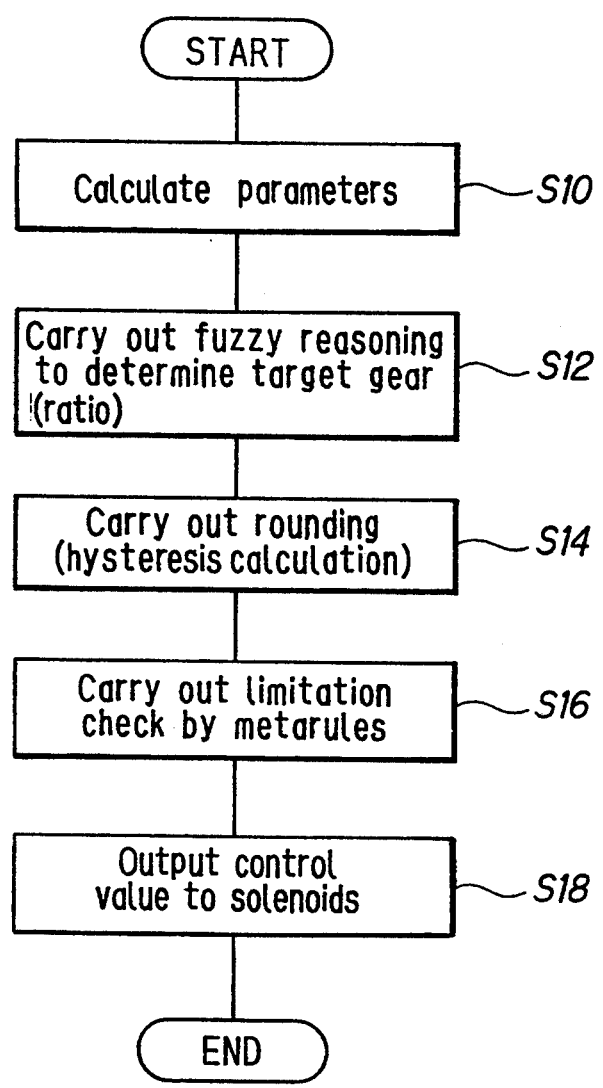
FIG. 3 is a main routine flow chart showing the operation of the control unit shown in FIG. 2.

As shown in FIG. 3, therefore, the procedure begins with the calculation of the parameters in step S10, more specifically with the detection and calculation of the parameters to be used in the fuzzy reasoning. The fuzzy reasoning parameters used are the vehicle speed V (km/h), the current gear position (gear ratio; in principle determined from the ON/OFF pattern of the solenoids 36, 38), the throttle opening θTH [0°–84° (WOT)], the driving resistance (kg) and the ATF temperature (°C). While these parameters are for the most part obtained as sensor output values or as values calculated from the sensor output values, the driving resistance is obtained by calculation. Specifically, as explained in detail in the aforesaid assignee's Japanese Laid-open Publication No. 4(1992)-8,964 (U.S. Ser. No. 691,066), the driving resistance can be obtained from the law of motion as Driving resistance=Motive force−{(1+Equivalent mass)×Vehicle mass×Vehicle acceleration} where the motive force is obtained by multiplying the engine output by the transmission efficiency and overall gear ratio of the transmission and dividing the product by the radius of the wheels 48. (The equivalent mass (equivalent mass coefficient) is a constant.)

Control next passes to step S12 of the flow chart of FIG. 3 in which the gear ratio is determined by fuzzy reasoning. This fuzzy reasoning is described in detail in the assignee's earlier publication and since the reasoning method itself is not a feature of the present invention, it will only be explained briefly here. First, the detected (calculated) parameters relating to the antecedent (IF part) of each rule are applied to the corresponding membership functions, the values on the vertical axes (membership values) are read, and the smallest of the values is taken as the degree of satisfaction of the rule. Next, the output value (position of the center of gravity and the weight) of the consequent (THEN part) of each rule is weighted by the degree of satisfaction of the antecedent and the average is calculated:

Fuzzy calculation output =
  Σ {(Degree of satisfaction of individual rules) ×
     (Position of center of gravity of output) ×
     (Weight)}/Σ {(Degree of satisfaction of individual rules) ×
     (Weight)}

It is also possible to use the conventional method in which the degree of satisfaction of the antecedent of each rule is used to truncate the output value, the truncated waveforms are then synthesized, and the center of gravity of the resulting synthesized waveform is obtained and used as the fuzzy calculation output.

Following the determination of the gear ratio in step S12, control passes to step S14 in which the determined gear position (ratio) is subjected to rounding (and hysteresis calculation). Since the value obtained by the fuzzy reasoning is a weighted mean value and, as such, frequently includes a fractional part, rounding is conducted for specifying the gear that is to be shifted to. Further, in order to prevent control hunting at times when the value obtained by the fuzzy reasoning changes frequently, the gear position is selected in accordance with hysteresis appropriately set between the gear positions. This is also explained in detail in the aforesaid assignee's earlier publication, and since it is not a feature of the present invention, will not be gone into further here.

Control next passes to step S16 in which a limitation check of the selected gear position is conducted. This is a final check of the selected gear position using the metarules of FIG. 4, which are rules stipulating limitations relating to the physical properties of the engine. The gist of these rules, which are mainly for preventing engine overrevving, is as follows:

1. If the vehicle speed is so high that the engine will obviously overrev when shifting down to the target gear position, then raise the target gear by one gear position.

2. If the target gear and the current gear are the same and the engine will overrev owing to increase in the engine speed if shift-up is carried out at a later time, then raise the target gear up by one gear position at the current time.

Step S16 is thus for checking the determined value based on these rules. However, as the manner in which the check is carried out is fully described in the aforesaid assignee's earlier publication, it will not be discussed further here.

Control then passes to the final step S18 in which in response to the determined results, a control value is output such that the solenoids 36, 38 are energized so as to shift to or hold the gear position subjected to the limitation check.

In this embodiment, a fuzzy production rule having the ATF temperature as an input parameter is established and the gear position is lowered by one speed when the ATF temperature is high. Because of this, the weighted mean of the reasoned value obtained will indicate a lower gear position when the AFT is high and, as a result, the amount of slipping of the torque converter 22 will be decreased, thus reducing the amount of heat generated owing to friction and preventing the ATF temperature from rising further. Moreover, the shift to a lower gear will cause an increase in the engine speed, which will in turn be increased by the torque converter 22 (although the increase rate will be lowered by the shiftdown), thereby ensuring that the motive force will not become insufficient during hill-climbing or the like. Owing to this arrangement, the control according to this embodiment of the invention makes it possible to suppress ATF overheating without turning on the lock-up clutch and sacrificing drivability.

A fuzzy production rule added for use in a second embodiment of the invention is shown in FIG. 7. This rule stipulates that the current gear position is to be held when the steering angle is large. Therefore, since the gear position is selected based on this rule in addition the rules 1–9 indicated in FIGS. 5 and 6, even during driving on a winding road in hilly country the transmission will be held in the current gear position to the maximum extent possible, so that repeated shifting will not occur at the beginning and end of successive curves and smooth cornering will be ensured by the suppression of changes in motive force while curves are being negotiated. Moreover, if the driver indicates a desire for increased motive force by depressing the accelerator pedal, the system's selection of the gear position through fuzzy reasoning enables it to respond to this desire by shifting down.

The aforesaid gear position holding effect is not only advantageous during cornering but also eases the task of maneuvering the vehicle into tight spaces as during parallel parking. The rule added by this embodiment comes into play only during cornering and tight maneuvering and does not have any adverse effect on drivability under ordinary driving circumstances since the steering angle is relatively small when the vehicle is traveling at higher speeds.

A fuzzy production rule added for use in a third embodiment of the invention is shown in FIG. 8. Differently from in the first embodiment, the consequent (the THEN part) of this rule calls for the gear position to be up-shifted when the coolant temperature is high so as to protect the engine by lowering its speed. As a result, the engine can be protected against overheating. Preferably, this upshifting owing to the coolant temperature rise is carried out without causing the ATF temperature to rise excessively. And it should also be noted that if both the coolant temperature and the ATF temperature become high, the control to lower the coolant temperature according to this embodiment should have a priority over the control to lower the ATF temperature according to the first embodiment. In the third embodiment, the coolant temperature will be lowered, without upshifting, by turning the lock-up mechanism on.

While in the second and third embodiments the rules of FIGS. 7 and 8 are used in place of the rule 10 in FIG. 6, this is not limitative and it is alternatively possible to use these three rules in combination. It is also possible to use any two of the three rules in combination.

In addition, although the embodiments described in the foregoing relate to examples employing a multi-step transmission, this is not limitative and the invention can also be applied to a vehicle with a continuously variable transmission. Moreover, instead of ascertaining engine load from the throttle opening, it is possible to ascertain it from the amount of depression of the accelerator pedal.

While the above description discloses preferred embodiments of the invention, numerous modifications or alteration may be made without departing from the scope of the invention as set in the following claims.

What is claimed is:

1. A system for controlling a gear ratio of a multi-step geared or continuously variable automatic transmission of a vehicle, including:
   first means for determining parameters at least indicative of an engine load and a vehicle speed;
   second means for establishing a membership function of a fuzzy set for each of the parameters determined by said first means of fuzzy production rules each defining respective gear ratio shifting conclusions:
   third means for carrying out a fuzzy reasoning based on the fuzzy production rules to determine said respective gear ratio shifting conclusions and to determine a gear ratio to be shifted to; and
   actuator means for driving a gear ratio shift control mechanism in response to the determined gear ratio:
   wherein the improvement comprises:
   said first means further determines parameters each indicative of a temperature of the transmission and an engine coolant temperature.

2. A system according to claim 1, wherein said third means carries out the fuzzy reasoning such that the gear ratio to be shifted to is determined to be increased if the temperature of the transmission is determined to be higher than a predetermined value or the engine coolant temperature is determined to be lower than a predetermined value.

3. A system according to claim 1, wherein said first means further determines a parameter indicative of steering angle of the vehicle, and said third means carries out the fuzzy reasoning such that the change of the gear ratio to be shifted to is determined to be small if it is determined that the steering angle is not the angle corresponding to the straight-ahead position.

4. A system according to claim 1, wherein said third means carrier out the fuzzy reasoning such that the gear ratio to be shifted to is determined to be decreased if the engine coolant temperature is determined to be higher than a predetermined value or the temperature of the transmission is determined to be lower than a predetermined value.

5. A system according to claim 4, wherein said second means gives a priority to lowering the coolant temperature over lowering the temperature of the transmission.

6. A system for controlling a gear ratio of a multi-step geared or continuously variable automatic transmission of a vehicle, including:
   first means for determining parameters at least indicative of an engine load and a vehicle speed;
   second means for carrying out a fuzzy reasoning at least using the determined parameters to determine a gear ratio to be shifted to; and
   actuator means for driving a gear ratio shift mechanism in response to the determined gear ratio:
   wherein the improvement comprises:
   said first means further parameters each indicative of a temperature of the transmission and an engine coolant temperature;
   said second means carries out the fuzzy reasoning using the engine coolant temperature such that the gear ratio to be shifted to is determined to be decreased if the engine coolant temperature is determined to be higher than a predetermined value; and
   said second means gives a priority to lowering the coolant temperature over lowering the temperature of the transmission.

* * * * *

UNITED STATES PATENT AND TRADEMARK OFFICE
CERTIFICATE OF CORRECTION

PATENT NO. : 5,337,630
DATED : August 16, 1994
INVENTOR(S) : Sakai et al

It is certified that error appears in the above-indentified patent and that said Letters Patent is hereby corrected as shown below:

Claim 4, column 8, line 20, aftr "means" delete "carrier" and insert --carries --.

Signed and Sealed this

Twenty-fifth Day of April, 1995

Attest:

BRUCE LEHMAN

*Attesting Officer*   *Commissioner of Patents and Trademarks*